(12) United States Patent
Goldfisher et al.

(10) Patent No.: US 7,873,129 B2
(45) Date of Patent: Jan. 18, 2011

(54) PHY CLOCK SYNCHRONIZATION IN A BPL NETWORK

(75) Inventors: Shmuel Goldfisher, Petach-Tikva (IL); Erez Geva, Gan-Yavne (IL)

(73) Assignee: Main.Net Communications Ltd., RaAnana (IL)

( * ) Notice: Subject to any disclaimer, the term of this patent is extended or adjusted under 35 U.S.C. 154(b) by 68 days.

(21) Appl. No.: 12/513,862

(22) PCT Filed: Nov. 8, 2007

(86) PCT No.: PCT/IL2007/001379

§ 371 (c)(1), (2), (4) Date: May 7, 2009

(87) PCT Pub. No.: WO2008/056366

PCT Pub. Date: May 15, 2008

(65) Prior Publication Data

US 2010/0020908 A1  Jan. 28, 2010

Related U.S. Application Data

(60) Provisional application No. 60/865,453, filed on Nov. 13, 2006, provisional application No. 60/864,987, filed on Nov. 9, 2006.

(51) Int. Cl.
*H04L 7/00* (2006.01)

(52) U.S. Cl. .................. 375/354; 375/295; 375/316; 375/356; 375/364

(58) Field of Classification Search .................. 375/354, 375/295, 316, 356, 364
See application file for complete search history.

(56) References Cited

U.S. PATENT DOCUMENTS

| 5,854,784 | A  | 12/1998 | Sölve et al.     |
|-----------|----|---------|------------------|
| 6,927,672 | B2 | 8/2005  | Zalitzky et al.  |
| 6,995,657 | B2 | 2/2006  | Zalitzky et al.  |
| 7,020,074 | B1 | 3/2006  | Rickard et al.   |

(Continued)

FOREIGN PATENT DOCUMENTS

WO  WO 2008/056366  5/2008

OTHER PUBLICATIONS

International Search Report and the Written Opinion Date Jul. 3, 2008 From the International Searching Authority Re.: Application No. PCT/IL07/01379.

(Continued)

*Primary Examiner*—Ted M Wang

(57) ABSTRACT

A method and a communication modem for broadband communication over power transmission lines. The modem includes a coarse level synchronization mapping unit which maintains a regularly updated coarse level clock synchronization map of neighboring communication units with which it is likely to exchange communications; and a second level synchronization unit which utilizes session handshakes and session data capacity to increase the synchronization level with a neighboring communication unit to allow a communication session to be held at a higher modulation level than the coarse level synchronization is able to support.

22 Claims, 4 Drawing Sheets

U.S. PATENT DOCUMENTS

| | | |
|---|---|---|
| 7,231,280 B2 | 6/2007 | Costa |
| 7,436,808 B2 * | 10/2008 | Geva et al. .................. 370/337 |
| 2004/0037317 A1 | 2/2004 | Zalitzky et al. |
| 2004/0174851 A1 | 9/2004 | Zalitzky et al. |
| 2004/0240451 A1 | 12/2004 | Lee et al. |
| 2004/0264501 A1 | 12/2004 | Zalitzky et al. |
| 2005/0008028 A1 | 1/2005 | Efrati et al. |
| 2006/0077047 A1 | 4/2006 | Zalitzky et al. |
| 2006/0223461 A1 | 10/2006 | Laroia et al. |
| 2008/0112473 A1 | 5/2008 | Refaeli et al. |
| 2008/0112474 A1 | 5/2008 | Refaeli |

OTHER PUBLICATIONS

Official Action Dated Jul. 24, 2009 From the US Patent and Trademark Office Re.: U.S. Appl. No. 11/938,890.

Responde Dated Oct. 22, 2009 to Official Action of Jul. 24, 2009 From the US Patent and Trademark Office Re.: U.S. Appl. No. 11/938,890.

* cited by examiner

PHY CLOCK SYNCHRONIZATION IN A BPL NETWORK

RELATED APPLICATIONS

This application is a National Phase Application of PCT Patent Application No. PCT/IL2007/001379 having International Filing Date of Nov. 8, 2007, which claims benefit under 35 U.S.C. §119(e) from U.S. Provisional Patent Application No. 60/865,453, filed Nov. 13, 2006, and U.S. Provisional Patent Application No. 60/864,987, filed Nov. 9, 2006. The contents of the above Application are all incorporated herein by reference.

FIELD AND BACKGROUND OF THE INVENTION

The present invention, in some embodiments thereof, relates to synchronization between units in a communication network, and more particularly, but not exclusively, to the issue of synchronization in a broadband over power line (BPL) network.

Power line communications networks typically require modems or communication nodes or communication units that are connected to the electric grid, to provide a network topology based on the electric grid connecting these nodes. Any two nodes in a power line network which are situated within a reasonable distance of each other are able to communicate with each other, but these units must generally have their PHY clocks synchronized so that the units can exchange high modulation transmissions.

According to the current HomePlug AV and BPL Specifications, synchronization is based on a central master unit governing timing over the whole network. The central unit sends beacons or messages to all network nodes to ensure clock synchronization of the nodes' PHY clocks. The result is a commonly used solution called shared clock where one unit shares its clock with the rest of the units. However, this concept was intended for and works best on single hops where all the units hear each other and the central clock more or less directly, and is not optimal for the multi hop environment which is generally the case in a BPL network or a BPL part of a complex of BPL and AV networks. The power line network being used can be quite large and individual units can be connected to numerous neighboring units and those units to numerous others, rendering it impractical to share a single clock source. The result is that PHY level clocks of the neighboring units unable to share a clock source may end up not being fully synchronized.

The shared clock solution teaches the sending of beacons, or synchronization messages between units. Each unit sends a periodic beacon over its area of influence, and these messages also carry information about time domains which are open or closed for transmission. However as the number of units increases, the number of beacons increases exponentially, becoming harder to schedule. The beacons are themselves liable to collision, leading to loss of the corresponding data.

Suitable synchronization between transmitter units and receiving units communicating in a power line network is desirable in order to succeed with high modulations, for example QAM 1024. In fact, the definition of high level, for which good synchronization is needed is basically application dependent. Some applications may generally require good synchronization, so that even 16 QAM can require accuracy of PHY clock synchronization.

Orthogonal Frequency-Division Multiplexing (OFDM) is often used in a power line network since it is particularly suitable for noisy environments. However if each unit uses what is in effect a different clock source, the PHY clocks may be corrupted and consequently loose their synchronization. Without good synchronization, the PHY clocks are not the same, and ppm (parts per million) differences create drifts over time.

Accordingly there is a need for providing an alternative PHY clock synchronization method and system, to provide the necessary high level of PHY clock synchronization, when communicating using OFDM in power line networks.

SUMMARY OF THE INVENTION

The present embodiments provide a method and apparatus for point to point synchronization in a network used for communication. Each unit of the network maintains course PHY clock synchronization information of neighboring units, the coarse synchronization allowing relatively low level modulation to be used in communication sessions between the units. When a higher level modulation session is needed then the course synchronization information is used as the basis for obtaining greater PHY clock synchronization. Increasing the synchronization from the coarse level requires less data exchange than obtaining high level synchronization from scratch, and thus allows use of components within the handshake protocols to transfer the necessary clock data.

According to a first aspect of the present invention there is provided a synchronization method for broadband communication between a network of sending and receiving units over power transmission lines, the method comprising:

providing regularly updated coarse background clock synchronization between pairs of sending and receiving units likely to transmit to each other;

during handshake for a communication session between a respective one of the pairs for which a modulation level higher than that which is supportable from the coarse synchronization is required, exchanging at least partial clock information; and using the exchanged clock information, increasing a level of synchronization above the coarse background synchronization level, thereby to support the required modulation level.

In an embodiment, the at least partial clock information is exchanged via insertion into predefined components of the handshake.

In an embodiment, the at least partial clock information is exchanged via insertion into a synchronization message.

In an embodiment, one of the pair is a transmission device and the other of the pair is a receiving device, and the transmission device provides the at least partial clock information to the receiving device, thereby to act as session synchronization master.

In an embodiment, one of the pair is a transmission device and the other of the pair is a receiving device, and the receiving device provides the at least partial clock information to the transmission device, thereby to act as session synchronization master.

In an embodiment, one of the pair is part of a domestic network with network internal common clock, and the device being one of the pair provides the at least partial clock information, thereby to make the network internal common clock act as a synchronization session master.

The method may comprise using the higher modulation session to transfer additional clock information to further increase the synchronization level, thereby to allow a yet higher modulation session.

The synchronization message may be a SOUND message or part of a tonemap. The tonemap maps noise to different frequencies so that modulation can avoid troublesome frequencies or be made more robust as necessary. The SOUND message, is a test message sent over the connection to test the line parameters, and from which the tonemap can be built up. Increase of synchronization level may use a lower and a higher modulation level of tonemap, and synchronization messages can also transfer clock information using the ROBO or minimal level robust modulation built into the system.

According to a second aspect of the present invention there is provided a communication unit for use as a sending or receiving unit for broadband communication within a network of communication units over power transmission lines, the communication being through sessions between pairs of communication units, each session having a modulation level, each modulation level requiring a synchronization level, the unit comprising:

a coarse level synchronization mapping unit configured to maintain a regularly updated coarse level clock synchronization map of neighboring communication units with which it is likely to exchange communications; and a second level synchronization unit configured to utilize session handshakes to increase a synchronization level with a neighboring communication unit beyond that supported by a respective coarse synchronization, thereby to allow a communication session to be held at a higher modulation level than the coarse level synchronization is able to support.

In an embodiment, the second level synchronization unit is configured to exchange at least partial clock information with the neighboring unit during the session handshake, thereby to increase the synchronization level.

In an embodiment, the second level synchronization unit is configured to insert the at least partial clock information into predefined components of the session handshake.

In an embodiment, the predefined component is a synchronization message.

The unit may be configured as a transmission device, the neighboring device being a receiving device, and the transmission device provides the at least partial clock information to the receiving device, thereby to act as session synchronization master.

The unit may be configured as a transmission device the neighboring device being a receiving device, and the receiving device provides the at least partial clock information to the transmission device, thereby to act as session synchronization master.

In an embodiment, the neighboring device is part of a domestic network whose synchronization is defined by a network internal common clock, wherein unit is configured to accept that the neighboring device provides the at least partial clock information, thereby to make the network internal common clock act as a synchronization session master.

In an embodiment, the second level synchronization unit is configured to use a session handshake of the higher modulation session to transfer additional clock information to further increase the synchronization level, thereby to allow a yet higher modulation session.

According to a third aspect of the present invention there is provided a communication unit for use as a sending or receiving unit for broadband communication within a network of communication units over power transmission lines, the communication being through sessions between pairs of communication units, each session having a modulation level, each modulation level requiring a synchronization level, the unit comprising a coarse level synchronization mapping unit configured to maintain a regularly updated coarse level clock synchronization map of neighboring communication units with which it is likely to exchange communications, the synchronization map being consulted for a corresponding entry when setting up a communication session with a respective one of the neighboring units.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
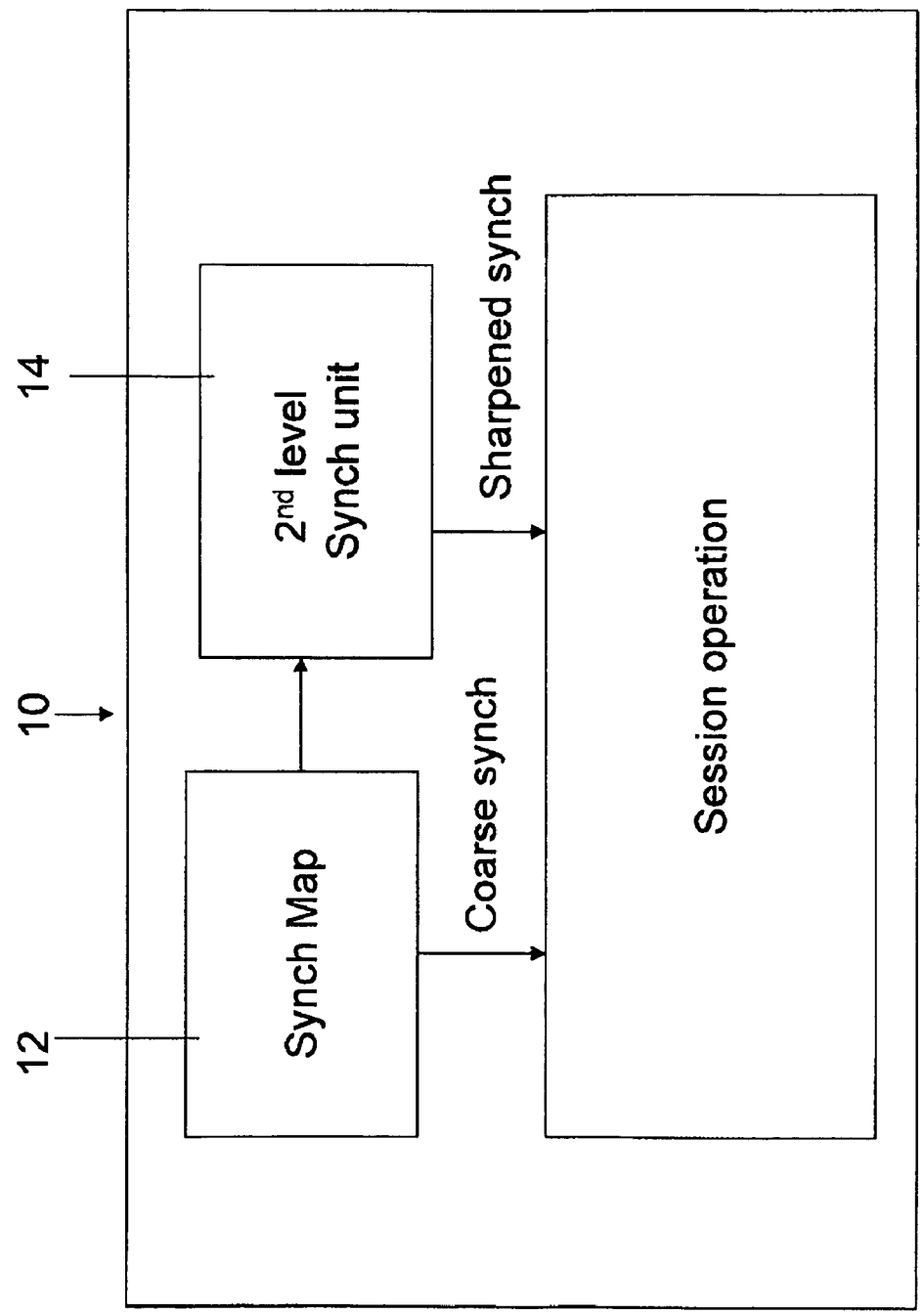
FIG. 1 is a simplified diagram showing a modem or communication unit according to a first embodiment of the present invention.

The present invention, in some embodiments thereof, relates to a method and apparatus for synchronization of communication units in a power line communication network. In a BPL network, communication is in sessions between pairs of units distributed over the power lines. The sessions require a certain level of synchronization between the communicating units depending on the level of modulation required for the particular communication. Higher levels of modulation require higher levels of synchronization. Higher levels of synchronization are otherwise referred to herein as sharper synchronization.

The power line is generally a noisy environment and the higher levels of modulation may not always be available due to the current noise level. Nevertheless it is desirable to utilize the higher modulations wherever possible. Thus it is common that different sessions select the highest modulation level available in view of the session needs.

As discussed in the background, having a master clock for the entire BPL network is not feasible. On the other hand there are numerous challenges associated with point to point synchronization. First of all each unit may communicate with numerous neighboring units in a typical network setup, and maintaining high levels of synchronization with all neighbors calls for a level of signaling overhead that may not be sustainable. On the other hand if the synchronizations are not maintained then a considerable burden is placed on the session handshake stage to set up a new synchronization between the two communicating units from scratch.

The present embodiments thus solve the problem by maintaining a map at each unit holding course level synchronization data for each neighboring unit. The course level synchronization data is sufficient to support sessions using relatively low modulation levels. Then, whenever a session requires a relatively high modulation session, the existing coarse synchronization may be sharpened. Generally, the sharpening may involve exchanging clock information and elements of the handshake protocol, for example, the defined packets which make up the protocol, to handle the necessary clock information. Thus the clock sharpening may be achieved without modifying the existing session handshake protocols. In general the units communicate in sessions, and each session requires a modulation level, and each modulation level requires a synchronization level.

In the event that a particularly high modulation level is required then successive sessions may be set up at increasingly high levels of modulation. At each handshake the synchronization is increased or sharpened above the previous synchronization level, until the required modulation level is reached.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a communication unit 10 for use as a sending or receiving unit for communication in a network. The unit may be particularly for broadband communication over power lines BPL. The communication typically utilizes sessions between pairs of communication units. Each session has a particular modulation level, and each modulation level requires a certain minimal synchronization level. The power line is generally a noisy environment and the higher levels of modulation may not always be available due to the current noise level. Nevertheless it is desirable to utilize the higher modulations wherever possible. Thus it is common that different sessions select the highest modulation level available in view of the session needs. However, as explained above, unit 10 does not necessarily retain the high level synchronization information needed to set up a session at the higher modulation levels.

Unit 10 therefore includes a coarse level synchronization mapping unit 12 which maintains a regularly updated coarse level clock synchronization map of neighboring communication units with which it is likely to exchange communications. That is to say it keeps a map of all of its neighboring units and for each unit on the map keeps coarse synchronization information. As will be explained below, coarse synchronization information is exchanged on a regular basis between the units using regular communications and does not require considerable overhead. The coarse synchronization data is sufficient to support low level communications sessions and is able to support modulation at a higher level than the robust modulation (ROBO) which is provided as the baseline modulation for the system. In fact the course level synchronization can be used directly to support a functioning network. However at times higher level modulation may be available, and as explained, it is desirable to make use of the extra capacity that this gives when it is available.

For this purpose, unit 10 includes a second level synchronization unit 14 which uses session handshakes to increase or sharpen the synchronization level with a particular neighboring communication unit for which a communication session is currently being requested. Synchronization may be between the PHY clocks of the individual devices. The existing synchronization of the map is added to or sharpened over the course of the handshake and possibly the initial data exchanges of the session. Typically this sharpening is achieved by exchange of clock information, and the exchange is made using spare capacity in the defined handshake or data exchange components of the session. The result is to reach a synchronization level beyond that of the coarse synchronization, so that the communication session can use the additional capacity provided by the higher level modulation.

Thus, a session operation unit 16 can manage a session using either the coarse synchronization taken directly from the coarse synchronization maps or it can obtain and use higher level synchronization from the $2^{nd}$ level synchronization unit 14, if the higher levels of modulation are available.

The predefined components or the handshake referred to may be part of a process that actually sounds out the line conditions to determine what modulation level is currently available. The clock information may be included, for example, in the spare capacity of the defined components of such a test procedure, or in the tone map or sound messages.

The unit 10 may operate as a link in the network, and may be the transmitter for certain sessions and the receiver for other sessions. As will be explained in greater detail below either the transmitting unit or the receiving unit may be the synchronization master in any particular synchronization instance, and the respective procedures are discussed.

The power line networks typically connect with domestic AV networks. Such domestic networks are generally much smaller than the power line networks so that all the units connect to a single central clock for synchronization. Any given power line unit may communicate with a neighboring unit that is part of such a domestic AV network. In such a case it may not be possible to force the neighboring unit into slave status with one's own clock since the entire AV unit uses a central clock. The problem may be solved by always setting the AV unit as master.

As mentioned, a higher level modulation session set up using the above procedure may itself support further clock sharpening to allow the setting up of an even higher level session. That is to say it is possible to use intermediate sessions as a way to reach a final desired modulation level. This is useful when there is not enough capacity in the handshake procedure for a single session to transmit enough of the clock for suitably high level synchronization.

Embodiments of the present invention relate to PHY clock synchronization performed in a BPL network in order to allow the usage of OFDM high modulation levels (for example, 256-QAM, 1024-QAM) by BPL nodes. Embodiments also relate to reducing collisions between beacons or synchronization messages, which are sent throughout the BPL network. The beacons carry information about time domains which are open or closed for transmission and also contain PHY clock data. The present embodiments obviate the need for continuous high levels of synchronization between all neighboring units and thus reduce the need for these beacons. The reduced number of beacons that may be needed can be more easily managed, for example by scheduling.

Further embodiments relate to synchronizing between neighbor BPL networks. Additional embodiments relate to synchronizing between BPL networks and neighboring AV networks, say as used at a domestic or commercial premises.

The HomePLUG AV Specification, used for domestic audio video (AV) networks, defines a central clock mechanism to maintain synchronization within the network. Typically the AV network comprises nodes which are under the control of a CCO (Master unit). The CCO generally sends a beacon message every 50-60 milliseconds toward the network nodes. On every beacon message, the CCO inserts its 32-bits clock, thus providing a network time base NTB.

As explained above, a method is provided in accordance with the present embodiments for PHY clock synchronization in BPL networks. BPL networks are different from domestic AV networks, particularly in terms of the single unit coverage range as compared to the overall size of the network. Due to the network size and the number of units in the network, the BPL may typically lack the ability to use the centralized messages of a master unit to synchronize all the units.

The present embodiments thus provide that each unit may maintain at least a coarse clock synchronization with every neighbor unit it has a valid tone-map with. Now, the need for a high level synchronized clock emerges only when high modulation is available between two nodes, but each node may use lower level modulated messages to generally retrieve the neighbor's clock information.

Synchronization of the neighboring clocks may thus be made using information embedded in the SOUND messages. The sound messages, as mentioned, are those messages used for frequency—noise characterization of the line, or messages that are used for OFDM modulation-tone-map synchronization between transmitter and receiver. That is to say the unit embeds as much as possible of its clock in the messages which every unit sends in the SNR and Tone-map synchronization process. This may be seen as a similar method as that which the HomePLUG AV's CCO uses to embed its 32 bit clock in the AV network beacon. Switching between coarse clock and higher level point-to-point PHY clock synchronization may be made as a part of the signaling process, and specifically the session handshake process of the BPL carrier sense multiple access (CSMA) based network. Handshake elements such as the request to send (RTS) and clear to send (CTS) messages which are modulated on low rate modulation do not themselves require a well-synchronized PHY clock, and have the capacity to insert significant parts of the clock, as will be explained.

There may be, for example, on the CSMA base network, reserved time slots which are assigned for specific, constant transmissions between predefined pairs of units, and in general transmitters and receivers are well-known to all neighbors and to themselves. A receiver can use such a reserved time slot, and prepare itself for an expected transmitter message at the beginning of such a reserved slot by synchronizing its own clock toward the transmitter clock, to achieve the background synchronization referred to below. Clock sharpening to a transmitter may involve the receiver using the message content/header assigned field to obtain the transmitter's clock value and does not require use of specific signaling components such as the RTS packet. Synchronization in such a time slot allows the receiver to begin the next reserved time slot with a sharpened clock. Now, the first of any sequence of assigned sessions may rely on signal handshake process for the time slot assignment registration, and such a handshake would be based on the CSMA structure, so the clock may be initially synchronized using the method mentioned above and the RTS and CTS handshake elements.

The PHY Clock synchronization mechanism may include background and real-time components for coarse and higher level synchronization as mentioned above.

Background PHY Clock Synchronization is considered first. One aim of the background process is to keep, on every BPL node, an updated list or map of the neighbor units and their clocks, whether these be BPL nodes or AV network members. This map provides a basic or coarse reference for more accurate synchronizing between transmitter and receiver in the actual data transmission process. In order to keep the map updated, each unit in the BPL network may use received messages from the various neighboring units as are regularly sent, including for example Channel-Estimation process Sound messages as mentioned above. These messages may include the transmitting unit PHY Clock as a reference.

It is noted that two units that share a tonemap use at least background synchronization for making this tonemap useful. In case synchronization is not complete, the units concerned may use the network's intrinsic ROBO modulation or a low modulation based tonemap, where the low modulation is at a level that does not need synchronization.

Again as part of the background synchronization, a BPL node may wish to synchronize not only with other BPL units but edge units of neighboring networks. For example the particular BPL unit may neighbor on a unit which is a member of a HomePLUG AV network, for example belonging to domestic premises. In such a case the BPL node may use the AV beacon, which can be obtained from the AV network to keep a reference of the AV network(s) clock updated in its map. Now the difference between AV units and BPL units is that AV units are part of an AV network with a central clock and thus if the BPL unit were to insist on being the synchronization master this would involve altering the specification of the entire AV network. Thus, in order to avoid changing the HomePLUG AV specification, AV nodes may automatically be treated as clock masters. Thus, whether a BPL node transmits toward an AV node or whether it receives a transmission from an AV node as a receiver, it may synchronize itself to the AV network PHY clock.

Using the background synchronization in the maps the units then enter a process of Real-time PHY Clock Synchronization during session set up, and use the handshake and associated data elements to transmit some or all of the PHY clock in order to attain sufficient synchronization for the modulation level appropriate for the session. Synchronization is master-slave synchronization in that one of the units involved is selected as the slave, and the slave synchronizes to the PHY clock of the unit selected as the master. The real time synchronization procedure differs depending on whether the transmitter or receiver is the synchronization master.

Figure 2:
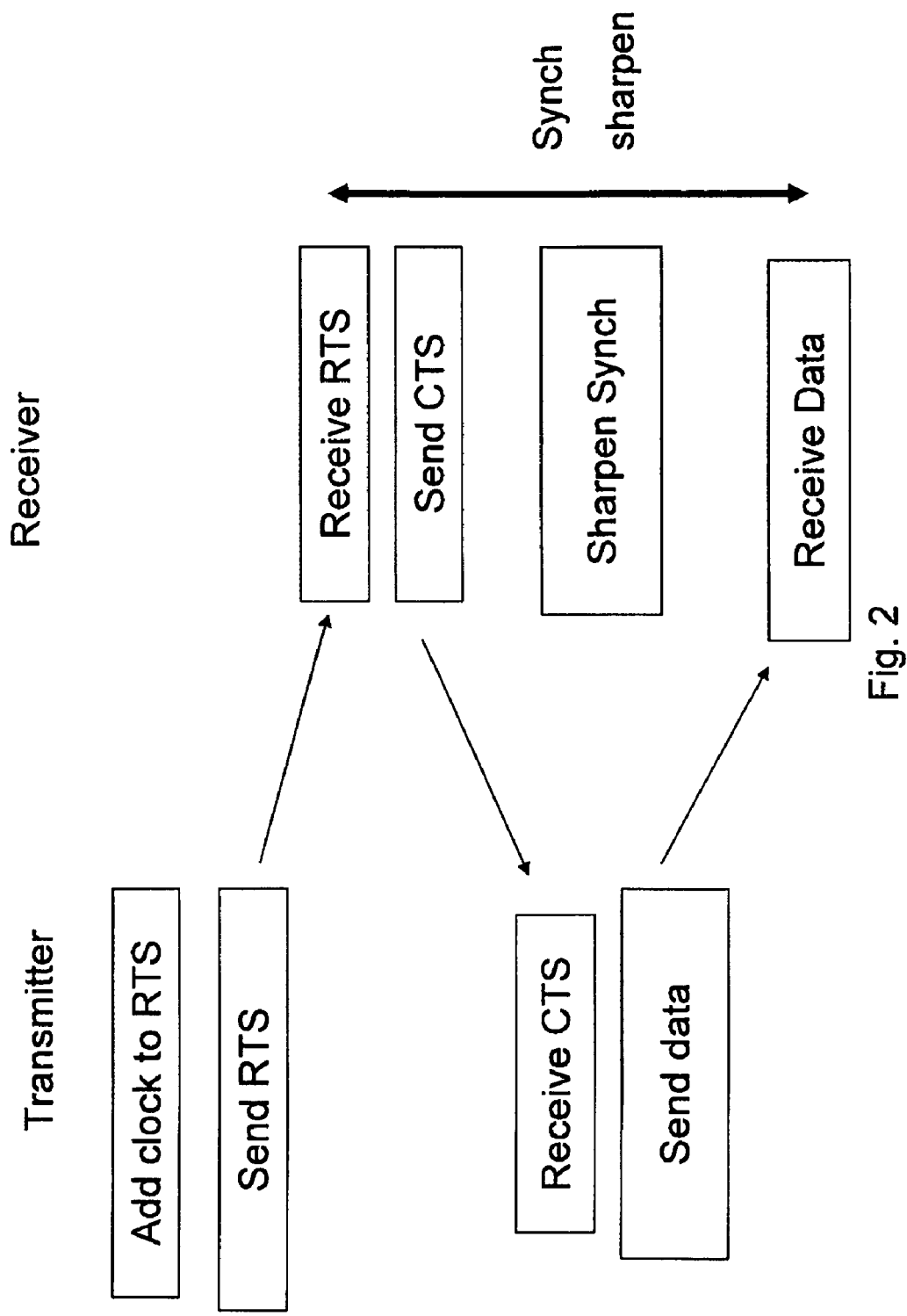
FIG. 2 is a simplified flow chart showing transmitter synchronization according to an embodiment of the present invention.

Reference is now made to FIG. 2, which is a simplified flow chart illustrating transmitter clock synchronization. The transmitter is the master clock and the receiver is the slave, which synchronizes its clock to the transmitter master. The RTS handshake element is the first stage in opening a CSMA session, and, in the present approach, the RTS may be used as the request for the receiver to synchronize its clock with the transmitter. The RTS may also include a small portion of the transmitter clock to allow the receiver to sharpen its transmitter clock view before the transmission begins.

If the receiver is able to get the transmission of the RTS, it may answer with the CTS element and set its clock according to the clock data in the RTS signal. In this approach clock synchronization is carried out by the receiver only after it has approved the transmission. It is also required that there is enough time to perform clock sharpening between the time of sending the CTS message and receiving the first data messages of the session.

Figure 3:
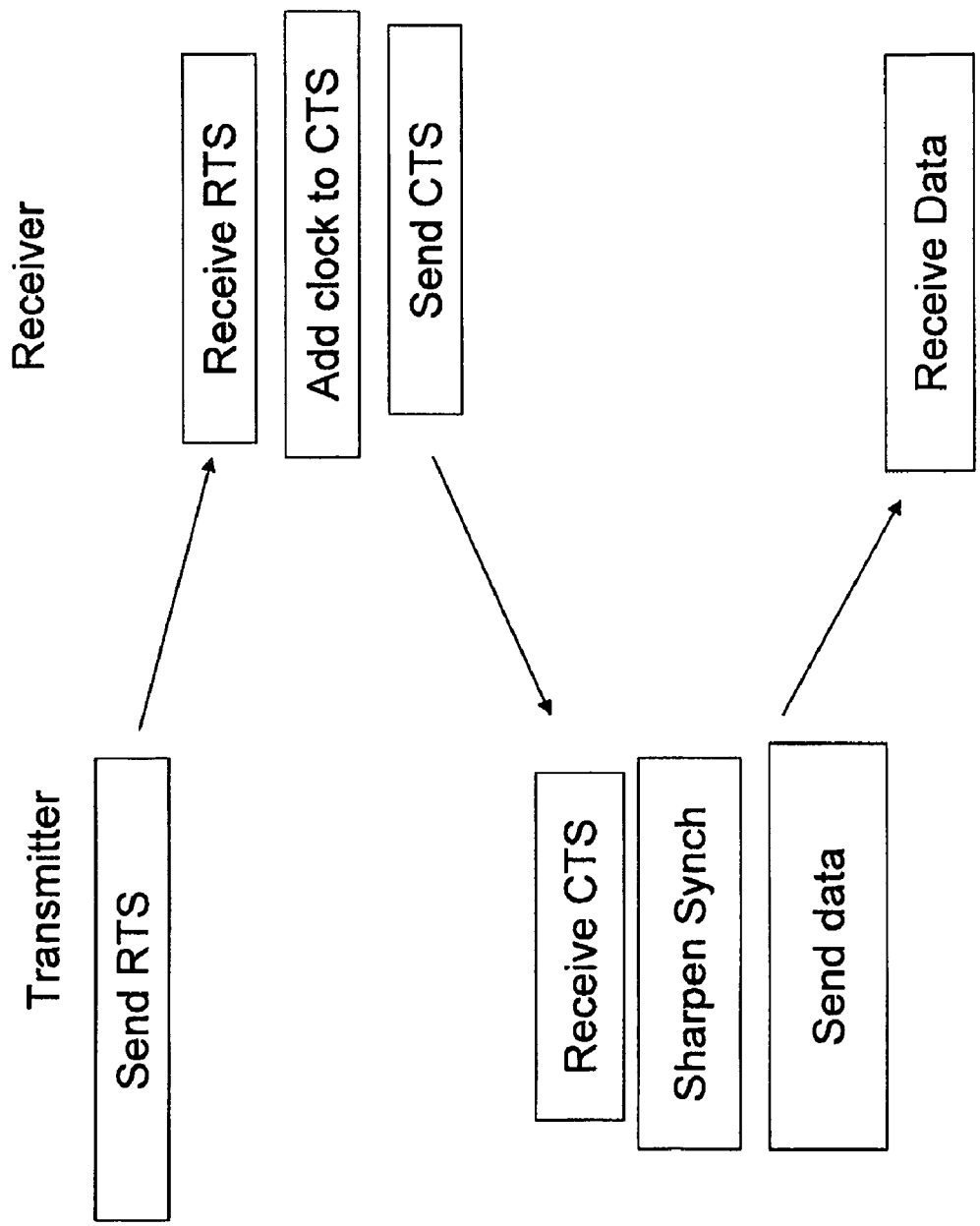
FIG. 3 is a simplified flow chart showing receiver synchronization according to an embodiment of the present invention.

Reference is now made to FIG. 3, which is a simplified flow chart illustrating receiver clock synchronization. A second direction for transmitter-receiver master-slave PHY clock synchronization is a Receiver clock synchronization—where the receiver is the master clock and the transmitter is the slave which synchronizes its clock to the receiver master. In this approach, the transmitter may set its clock according to the clock of the receiver it wishes to send data to. Background synchronization may already have occurred before the RTS is sent and then the real time clock sharpening occurs as illustrated, after getting the CTS from the receiver. The receiver may send a small portion of its clock in order that the transmitter may be able to sharpen its receiver clock view before sending data messages.

According to this approach background clock synchronization is carried out by the transmitter even before the initial RTS message is sent, and then, as shown, clock sharpening is based on the CTS. An advantage of receiver clock synchronization based on the CTS message is as follows. The RTS message has rather a small capacity for carrying parts of the clock since it carries much information of its own and its overall size is limited. By contrast the CTS message has more spare capacity, thereby enabling it to carry a larger portion of the receiver clock for the transmitter to use for clock sharpening. That is to say the CTS message contains less handshake information than the RTS message. Thus more clock data can be fitted in.

Of course, other approaches may be used.

Figure 4:
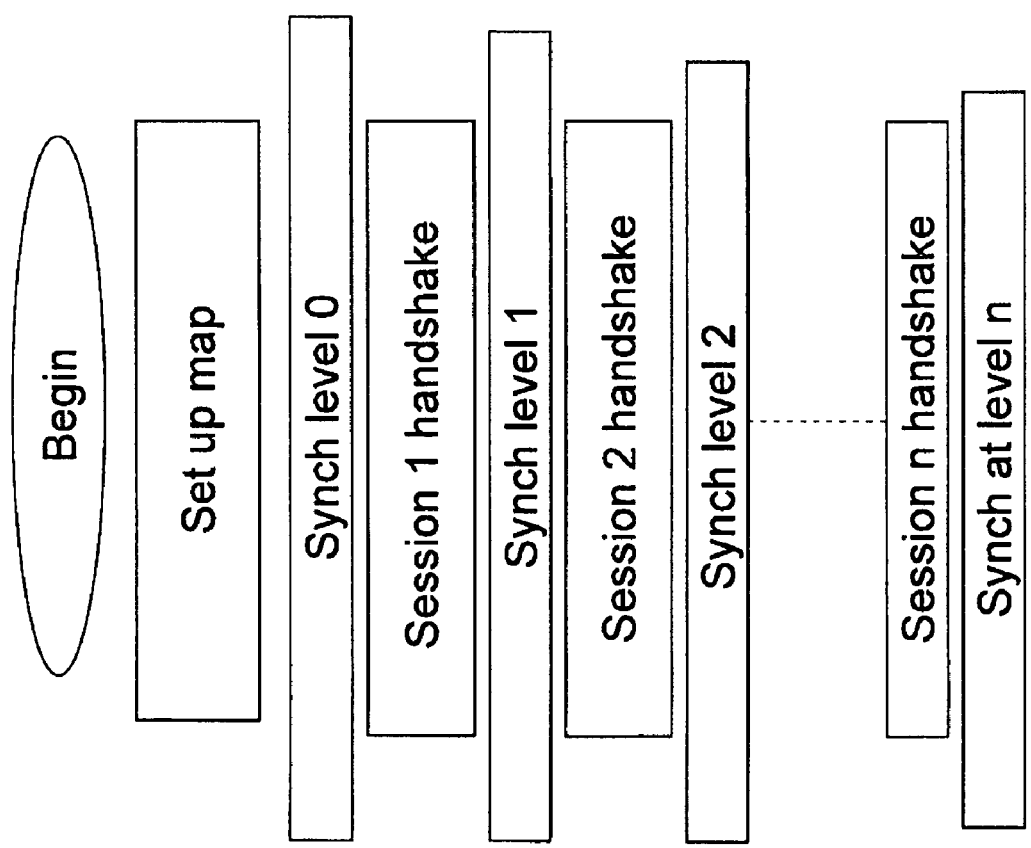
FIG. 4 is a simplified flow chart showing so-called jump-start synchronization according to a preferred embodiment of the present invention.

Reference is now made to FIG. 4, which illustrates a multi-level or jump-start synchronization, according to an embodiment of the present invention. It may occur that a particular level of modulation is needed for which the RTS and CTS elements available cannot contain enough bits for clock sharpening purposes. It may also be the case that a Tone-Map message interval is not short enough to allow for sufficient messages to contain the amount of clock necessary to reach the synchronization accuracy to support the higher layer of modulation. In this case a combination of two tone-maps may be used.

Jump start may also provide a default for starting from scratch when synchronization has been lost altogether.

This option can be considered as a "jump start", since whenever a session between two units begins, the system may use the first RTS-CTS-DATA session just for clock synchronization. After clock synchronization is carried out as much as possible from the first session, the following sessions may begin with a higher modulation, and each session may then synchronize the next session at successively higher modulations. In FIG. 4 a cascade of n modulations is shown.

In the event that synchronization has been lost altogether, a first session would be based on a low modulation which works even without synchronization and the second and subsequent modulations would use successively increasing levels of modulation. Now it is noted that the BPL standard has a built in default tone-map based on a low bandwidth modulation known as robust modulation or ROBO, but it is not optimal to use such a modulation. Thus, it may be preferable to use a default tone-map which is built in parallel to the optimized tone-map as part of the synchronization system of the present embodiments. The jump start and higher level tone-maps may look quite similar. However, the default/jump-start tone-map does not use modulations higher than the level that the clock synchronization built from the Tone-Map messages can support.

It is expected that during the life of a patent maturing from this application many relevant tone map and sound based synchronization systems will be developed as well as corresponding modulations and the scopes of the terms tone map and modulation are intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A synchronization method for broadband communication between a network of sending and receiving units over power transmission lines the method comprising:

providing regularly updated coarse background clock synchronization between pairs of sending and receiving units likely to transmit to each other;

during handshake for a communication session between a respective one of said pairs for which a modulation level higher than that which is supportable from said coarse synchronization is required, exchanging at least partial clock information; and using said exchanged clock information, increasing a level of synchronization above said coarse background synchronization level, thereby to support said required modulation level.

2. The method of claim 1, wherein said at least partial clock information is exchanged via insertion into predefined components of said handshake.

3. The method of claim 1, wherein said at least partial clock information is exchanged via insertion into a synchronization message.

4. The method of claim 1, wherein one of said pair is a transmission device and the other of said pair is a receiving device, and said transmission device provides said at least partial clock information to said receiving device, thereby to act as session synchronization master.

5. The method of claim 1, wherein one of said pair is a transmission device and the other of said pair is a receiving device, and said receiving device provides said at least partial clock information to said transmission device, thereby to act as session synchronization master.

6. The method of claim 1, wherein one of said pair is part of a domestic network with network internal common clock, and said device being one of said pair provides said at least partial clock information, thereby to make said network internal common clock act as a synchronization session master.

7. The method of claim 1, comprising using said higher modulation session to transfer additional clock information to further increase said synchronization level, thereby to allow a yet higher modulation session.

8. The method of claim 3, wherein said synchronization message is a tonemap or sound message.

9. The method of claim 1, wherein said synchronization message is transmitted using ROBO modulation to carry the additional clock information.

10. The method of claim 7, comprising using a combination of two tone-maps at respective synchronization levels.

11. A communication unit for use as a sending or receiving unit for broadband communication within a network of communication units over power transmission lines the unit comprising:

a coarse level synchronization mapping unit configured to maintain a regularly updated coarse level clock synchronization map of neighboring communication units with which it is likely to exchange communications; and a second level synchronization unit configured to utilize session handshakes to increase a synchronization level with a neighboring communication unit beyond that supported by a respective coarse synchronization, thereby to allow a communication session to be held at a higher modulation level than said coarse level synchronization is able to support.

12. The unit of claim 11, wherein said second level synchronization unit is configured to exchange at least partial clock information with said neighboring unit during said session handshake, thereby to increase said synchronization level.

13. The unit of claim 12, wherein said second level synchronization unit is configured to insert said at least partial clock information into predefined components of said session handshake.

14. The unit of claim 13, wherein said predefined component is a synchronization message.

15. The unit of claim 11, configured as a transmission device, said neighboring device being a receiving device, wherein said transmission device provides said at least partial clock information to said receiving device, thereby to act as session synchronization master.

16. The unit of claim 11, configured as a transmission device said neighboring device being a receiving device, wherein said receiving device provides said at least partial clock information to said transmission device, thereby to act as session synchronization master.

17. The unit of claim 11, wherein said neighboring device is part of a domestic network whose synchronization is defined by a network internal common clock, wherein unit is configured to accept that said neighboring device provides said at least partial clock information, thereby to make said network internal common clock act as a synchronization session master.

18. The unit of claim 11, wherein said second level synchronization unit is configured to use a session handshake of said higher modulation session to transfer additional clock information to further increase said synchronization level, thereby to allow a yet higher modulation session.

19. The unit of claim 14, wherein said synchronization message is a tonemap or sound message.

20. The unit of claim 14, wherein said synchronization message is transmitted using ROBO modulation to carry the additional clock information.

21. The unit of claim 18, comprising using a combination of two tone-maps at respective synchronization levels.

22. A communication unit for use as a sending or receiving unit for broadband communication within a network of communication units over power transmission lines, the unit comprising a coarse level synchronization mapping unit configured to maintain a regularly updated coarse level clock synchronization map of neighboring communication units with which it is likely to exchange communications, said synchronization map being consulted for a corresponding entry when setting up a communication session with a respective one of said neighboring units.

* * * * *